C. DE MURGUIONDO.
MOLD FOR PLASTIC MATERIALS.
APPLICATION FILED AUG. 2, 1912.
1,111,567.  Patented Sept. 22, 1914.
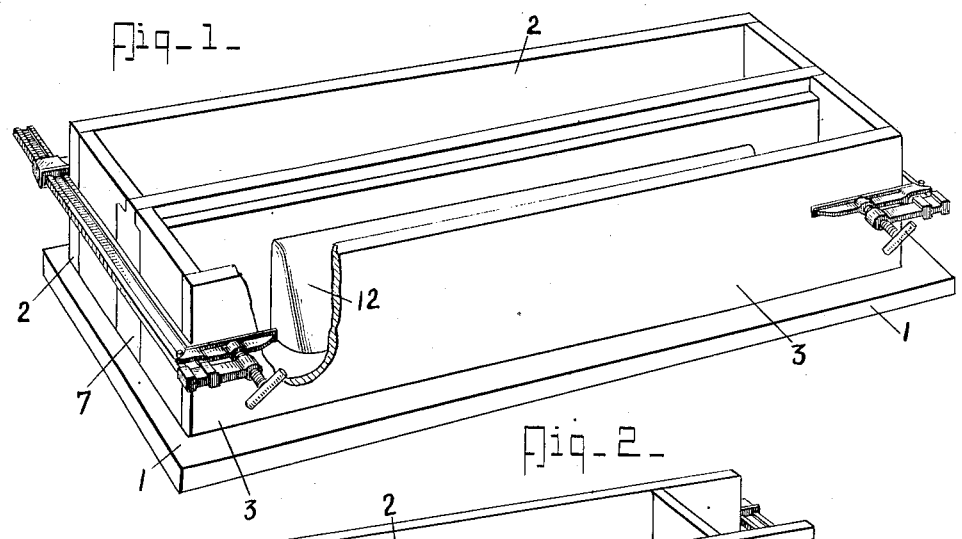
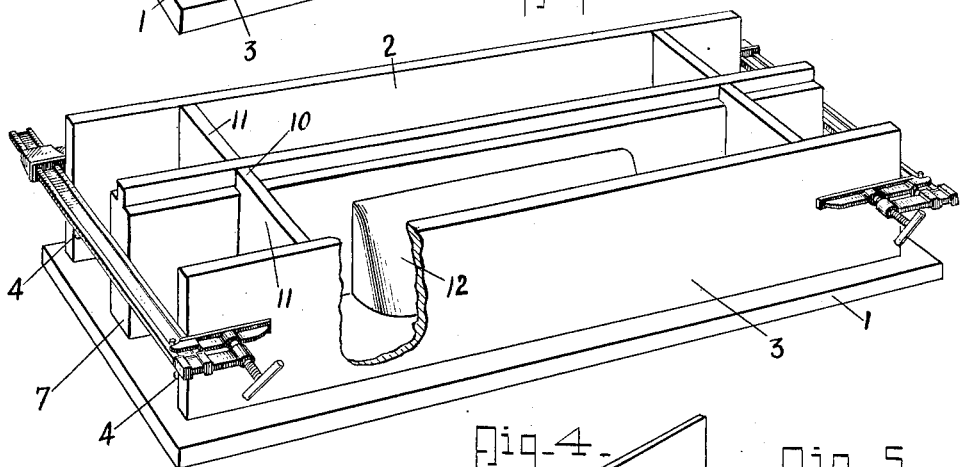
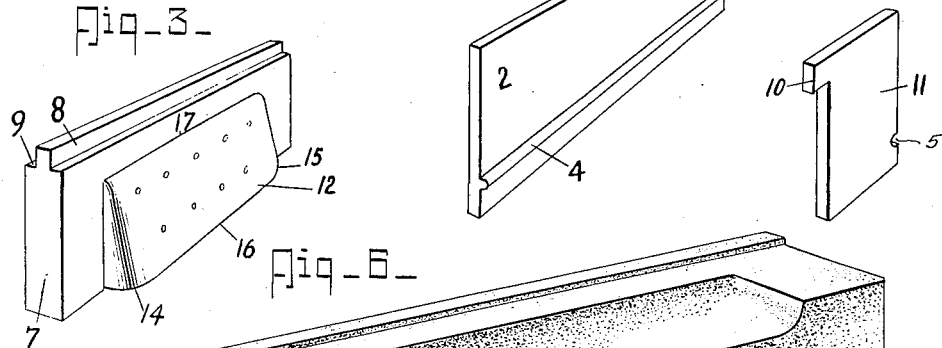
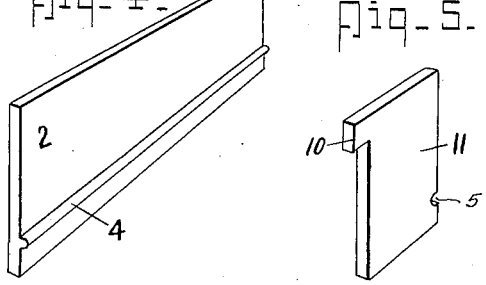
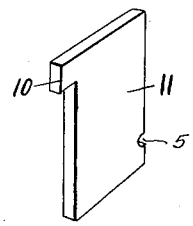
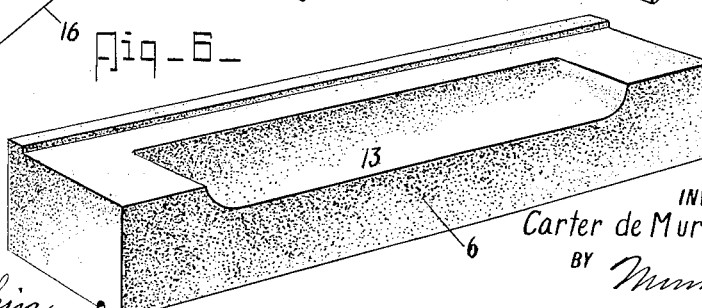
WITNESSES
Frank C. Palmer
A. L. Kitchin
INVENTOR
Carter de Murguiondo
BY Munn & Co
ATTORNEYS

UNITED STATES PATENT OFFICE.

CARTER DE MURGUIONDO, OF NEW YORK, N. Y.

MOLD FOR PLASTIC MATERIALS.

1,111,567.  Specification of Letters Patent.  Patented Sept. 22, 1914.

Application filed August 2, 1912.  Serial No. 712,912.

*To all whom it may concern:*

Be it known that I, CARTER DE MURGUIONDO, a citizen of the United States, and a resident of the city of New York, borough of Brooklyn, in the county of Kings and State of New York, have invented a new and Improved Mold for Plastic Materials, of which the following is a full, clear, and exact description.

The invention is a mold particularly adapted for molding window-sills from cement or analogous plastic material.

The details of construction are as hereinafter described, and illustrated in the accompanying drawing, in which—

Figure 1 is a perspective view of the mold, a portion being broken away to show interior construction. Fig. 2 is a view similar to Fig. 1 except that the ends of the mold are shown adjusted nearer each other than in Fig. 1, for the purpose of forming a shorter window-sill. Figs. 3, 4, and 5 are perspective views of different portions of the mold detached from each other. Fig. 6 is a perspective view of a sill produced by the mold.

The mold comprises a flat base 1, two side boards 2 and 3, a central dividing board 7, which is parallel to the sides, and end plates 11 which hold the sides duly separated from the dividing board. The top edge of the latter is provided with a rabbet on each side, and the side boards 2 and 3 are each constructed with a bead 4 on the inner side and adjacent to the bottom edge—see Fig. 4. The end plates or members 11 are correspondingly constructed, that is to say, they have at the top a lateral projection 10 adapted to fit in the rabbet 8, and on the opposite side, near the bottom, they are constructed with a groove 5 adapted to receive the bead 4 of a side member. By this related construction of the parts, the end plates 11 are held in place vertically between the sides and middle board, and are also guided when slid from one position to another, as required to adjust the mold for forming sills of different lengths.

In the molding operation, the function of the rabbet is to receive the plastic material and thus form a laterally projecting rib or overhang on one side of a window-sill 6, as shown in Fig. 6, while the function of the bead 4 on the side members 2 and 3 consists in forming in the molded sill a side groove $5^a$, which, in practice, receives the drip and carries it off at the ends of the sill.

Wooden core blocks 12, adapted to form the cavity 13 in the sill 6, are secured by screws to the sides of the central board 7. The cores are rounded at the corners 14 and 15 and the outer side is inclined from bottom 16 to top 17.

In using the mold, the adjustable ends 11 having been slid along to the place required by the length of the sill to be molded, the box-like cavities on each side of the central board are filled with plastic material, and the same is scraped and smoothed at the top to form a surface flush with the top of the mold.

What I claim is:—

The improved box-mold for plastic material comprising a flat base, parallel side boards each having a bead on the inner side adjacent to the lower edge, a central dividing board having a pair of longitudinal rabbets at the top, a removable core secured to said board on each side thereof, and movable ends each having a side groove on one edge to receive the aforesaid bead and a lateral projection at the top on the opposite edge, the same being adapted to engage one of the rabbets, as described.

In testimony whereof I have signed my name to this specification in the presence of two subscribing witnesses.

CARTER DE MURGUIONDO.

Witnesses:
 A. L. KITCHIN,
 JOHN P. DAVIS.